United States Patent
Inamura et al.

(10) Patent No.: US 11,059,460 B2
(45) Date of Patent: Jul. 13, 2021

(54) WASHER NOZZLE ARRANGEMENT STRUCTURE

(71) Applicants: MITSUBISHI JIDOSHA KOGYO KABUSHIKI KAISHA, Tokyo (JP); MITSUBISHI JIDOSHA ENGINEERING KABUSHIKI KAISHA, Okazaki (JP)

(72) Inventors: Toshiki Inamura, Okazaki (JP); Masahiro Minami, Tokyo (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Okazaki (JP)

( * ) Notice: Subject to any disclaimer, the term of this patent is extended or adjusted under 35 U.S.C. 154(b) by 264 days.

(21) Appl. No.: 15/909,195

(22) Filed: Mar. 1, 2018

(65) Prior Publication Data

US 2018/0251101 A1  Sep. 6, 2018

(30) Foreign Application Priority Data

Mar. 2, 2017 (JP) .............................. JP2017-039762

(51) Int. Cl.
*B60S 1/58* (2006.01)
*B60S 1/52* (2006.01)
*B62D 35/00* (2006.01)

(52) U.S. Cl.
CPC ................. *B60S 1/583* (2013.01); *B60S 1/52* (2013.01); *B62D 35/007* (2013.01); *Y02T 10/82* (2013.01)

(58) Field of Classification Search
CPC .... B60S 1/583; B60S 1/52; B60S 1/56; B60S 1/58; B60S 1/566; B62D 35/007; Y02T 10/82
USPC ............ 15/250.001, 250.16, 250.19, 250.01; 296/96.15
See application file for complete search history.

(56) References Cited

FOREIGN PATENT DOCUMENTS

JP          3275169 B2    4/2002
JP      2007-238073 A    9/2007
(Continued)

OTHER PUBLICATIONS

Translation of JP2008062810A from Espaceneton May 29, 2020 (Year: 2008).*

(Continued)

*Primary Examiner* — Gary K. Graham
*Assistant Examiner* — Thomas Raymond Rodgers
(74) *Attorney, Agent, or Firm* — Birch, Stewart, Kolasch & Birch, LLP

(57) ABSTRACT

A washer nozzle arrangement structure includes a rear spoiler, a wiper arm, a wiper blade and a washer nozzle. The rear spoiler is arranged on a portion of a body above a rear window and includes a recess part formed on a side of the rear window. A rotation center axis disposed on one end side of the wiper arm is supported on the vehicle. The wiper blade is supported on the other end side of the wiper arm, and is configured to be stored in the recess part when the wiper arm is in a stop position. The washer nozzle is configured to eject a washer liquid toward the rear window. The washer nozzle is arranged in an inside of a portion of the recess part which exists on a front side of the vehicle than the rotation center axis of the wiper blade.

4 Claims, 7 Drawing Sheets

(56) References Cited

FOREIGN PATENT DOCUMENTS

JP  2007238073 A  *  9/2007
JP  2008062810 A  *  3/2008

OTHER PUBLICATIONS

Extended European Search Report dated Aug. 3, 2018 in corresponding European Patent Application No. 18159360.9.

* cited by examiner

WASHER NOZZLE ARRANGEMENT STRUCTURE

BACKGROUND

This invention relates to an arrangement structure of a washer nozzle in a vehicle including a rear spoiler.

A spoiler (a rear spoiler) is provided on the rear end of a roof panel to rectify an airflow flowing along the roof of a vehicle. There is conventionally known a vehicle with a rear spoiler, in which, in order to blow rainwater and muddy water to secure a rear view during rainy weather, a washer nozzle for ejecting washer fluid to a rear window is provided on the upstream end of a rear gate or on the rear end of the vehicle roof (Patent Document 1). Also, in some vehicle with a rear spoiler, a rear wiper device for wiping raindrops and the like on the surface of the rear window is stored in the rear spoiler.

In the case that the rear wiper device is stored in the rear spoiler, in order to prevent deterioration of the appearance of the vehicle, it is important to mount a washer nozzle without exposing it as much as possible. Also, it is necessary to prevent washer liquid from being disturbed by running wind or the like. By increasing the size of the rear spoiler, the washer nozzle can be mounted in a state where the ejection of the washer fluid is prevented from being disturbed by running wind or the like. However, in this case, the airflow may not be rectified by the rear spoiler as sufficiently as aimed, which is also disadvantageous in view of the appearance of the vehicle.

[Patent Document 1] JP Publication No. 3275169

SUMMARY

The washer nozzle arrangement structure of the invention comprises:

a rear spoiler arranged on a portion of a body above a rear window and including a recess part formed on a side of the rear window;

a wiper arm, wherein a rotation center axis disposed on one end side of the wiper arm is supported on the vehicle;

a wiper blade, supported on the other end side of the wiper arm, and configured to be stored in the recess part when the wiper arm is in a stop position; and a washer nozzle configured to eject a washer liquid toward the rear window, wherein the washer nozzle is arranged in an inside of a portion of the recess part which exists on a front side of the vehicle than the rotation center axis of the wiper blade.

DETAILED DESCRIPTION OF EXEMPLIFIED EMBODIMENTS

The invention has an object to provide, for use in a vehicle including a rear spoiler with a rear wiper device stored therein, a washer nozzle arrangement structure in which, without deteriorating the appearance of the vehicle, a washer nozzle can be arranged in such a manner as to prevent ejection of washer liquid from being disturbed by running wind or the like.

Figure 1:
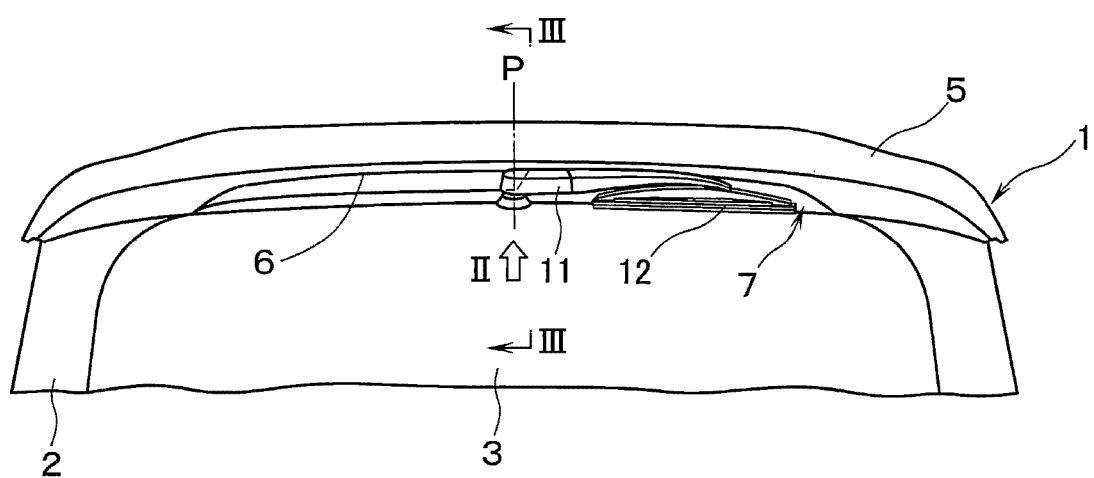
FIG. 1 is a front view of a rear part of a vehicle using a washer nozzle arrangement structure according to an embodiment of the invention.
Figure 2:
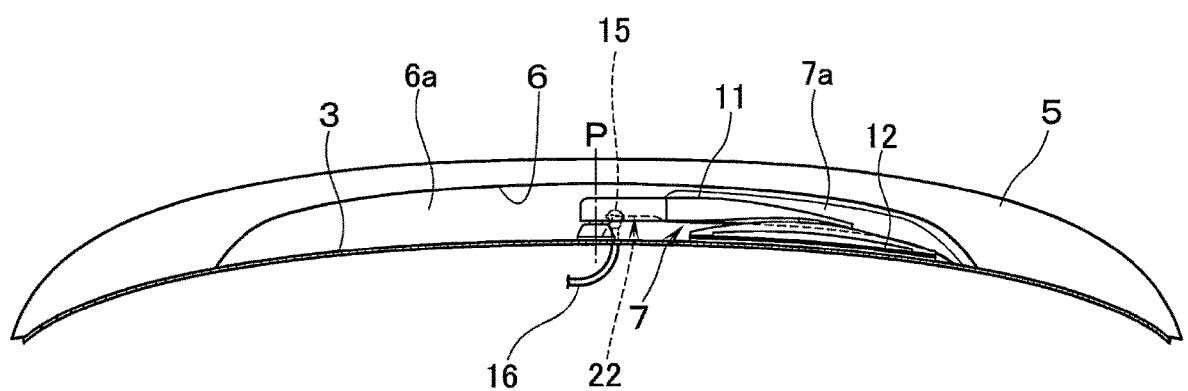
FIG. 2 is a view of a rear spoiler shown in FIG. 1 when viewed from below (a view taken along the direction of the arrow II of FIG. 1).
Figure 3:
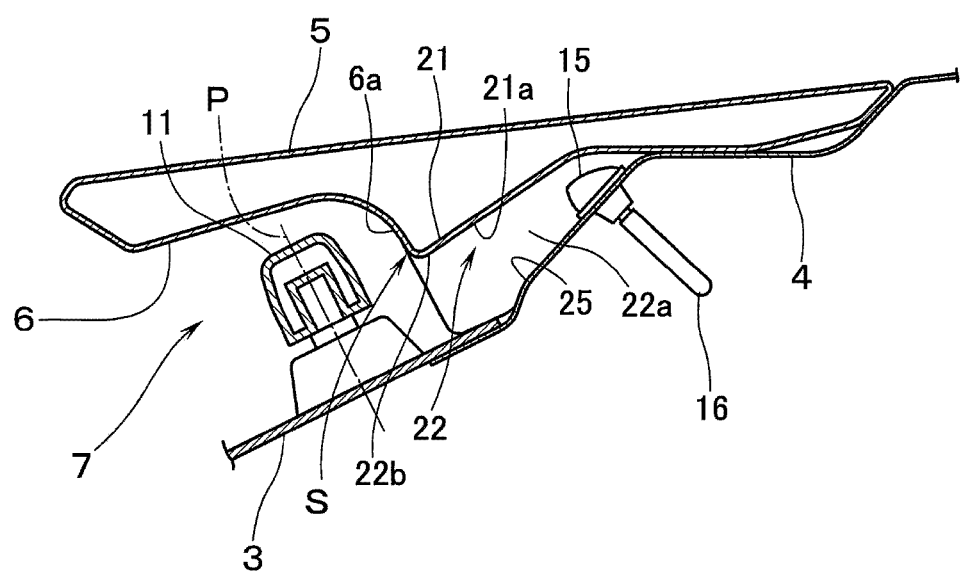
FIG. 3 is a section view taken along the arrow III-Ill of FIG. 1.
Figure 4:
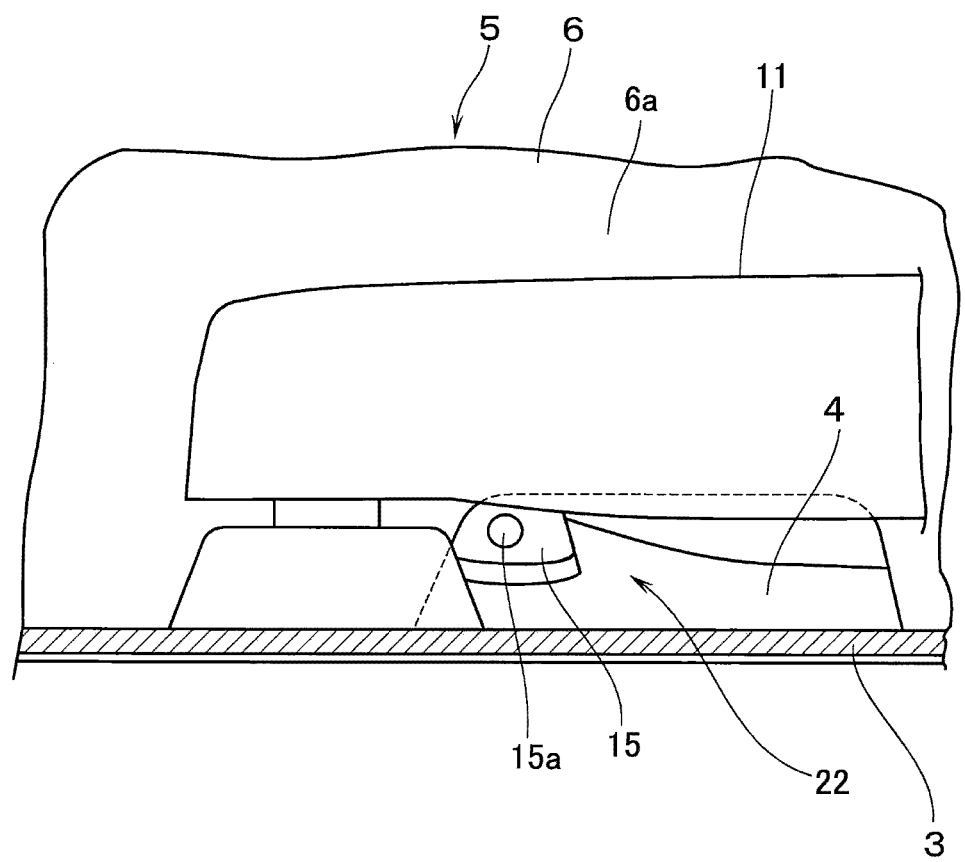
FIG. 4 is an enlarged view of main parts of FIG. 2.
Figure 5:
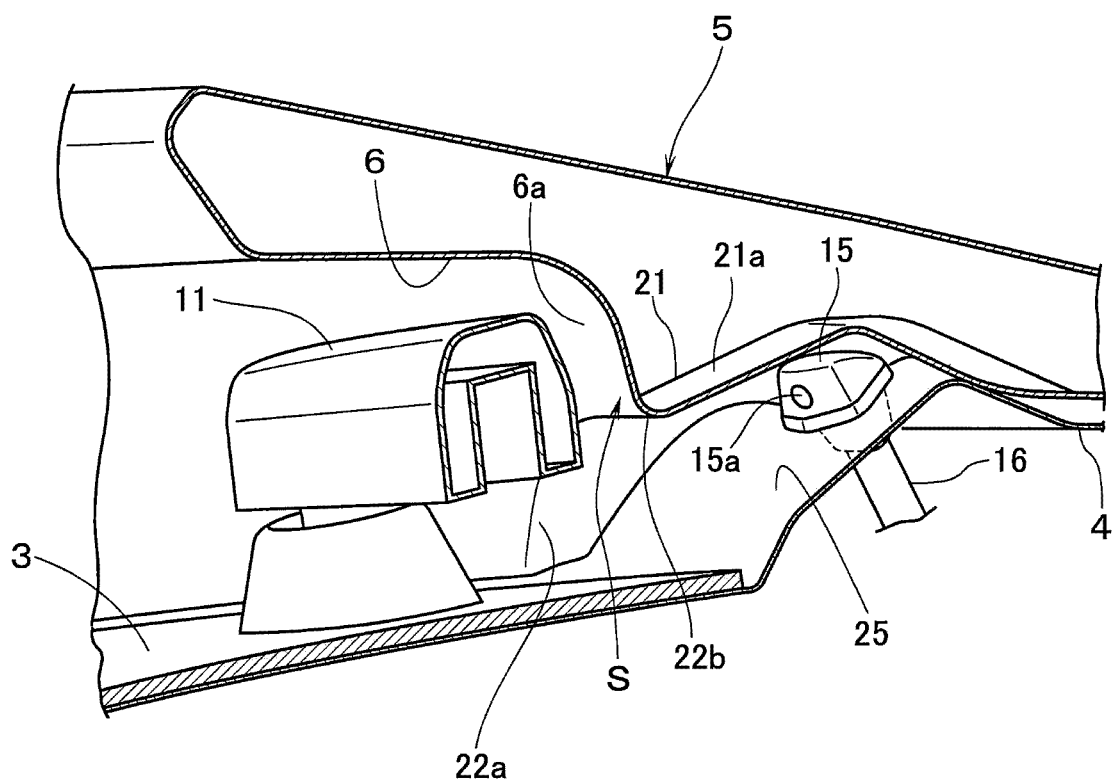
FIG. 5 is a sectional perspective view of FIG. 4.

FIG. 1 is a rear view of a vehicle using a washer nozzle arrangement structure according to an embodiment of the invention, when viewed from behind. FIG. 2 is a view of a rear spoiler shown in FIG. 1 when viewed from below (a view taken along the direction of the arrow II). FIG. 3 is a section view taken along the III-III line shown in FIG. 1. FIG. 4 is an enlarged view of a portion of FIG. 2 where a rotation center axis is provided. FIG. 5 is an external view of the portion of the rotation center axis when it is broken.

Figure 6:
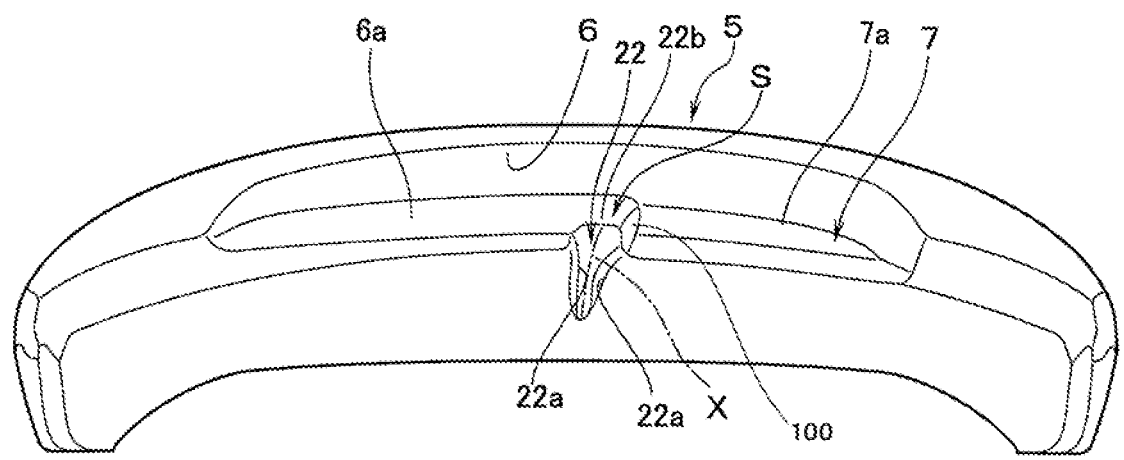
FIG. 6 is an external view showing the inside of the rear spoiler.
Figure 7:
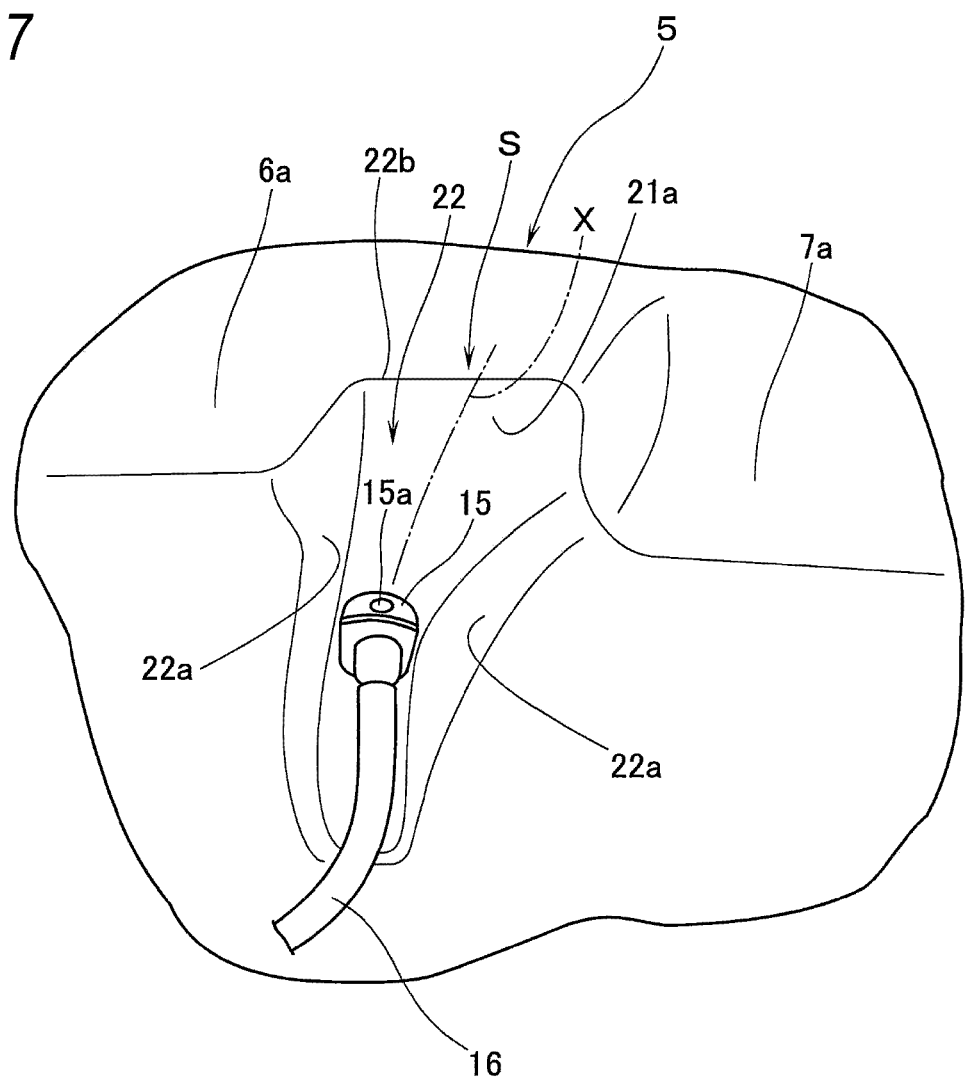
FIG. 7 is an enlarged view of main parts of FIG. 6.

Also, FIG. 6 shows the appearance of the inside surface of the rear spoiler. The inside surface of the rear spoiler shown in FIG. 6 is a surface on the side where the rear spoiler is mounted on the body of a rear window and also a surface which is opposed to a rear gate panel and the rear window. FIG. 7 shows the details of a state when the rear gate panel and rear window are removed after the washer nozzle is arranged in a groove part shown in FIG. 6.

As shown in FIG. 1, the rear window 3 is mounted on a rear gate 2 of a vehicle 1, and the front edge of the rear spoiler 5 is mounted on the upper end of a rear gate panel 4 (see FIG. 3) of the rear gate 2. In other words, the front edge of the rear spoiler 5 is mounted on the rear edge of the roof of the body. An airflow flowing along the roof is rectified by the rear spoiler 5.

A recess part 6 is formed on the back of the rear spoiler 5. More specifically, the recess part 6 is formed in such portion of the rear spoiler 5 as is opposed to the rear gate panel 4. The right side (in FIG. 1) of the recess part 6 serves as a storage part 7 for storing a wiper blade (to be discussed later). In other words, the wiper blade is stored into the inside of the rear spoiler 5 by the storage part 7. As shown in FIG. 6, a vertical wall 7a of the storage part 7 extending in the vehicle width direction is arranged to be retracted to the front side (deep side) of the vehicle 1 with respect to a vertical wall 6a of the recess part 6 extending in the vehicle width direction. That is, the storage part 7 forms a step portion 100 on a side of the stop position, which is recessed toward the front side of the vehicle from the vertical wall 7a. The wiper blade is stored in the step portion 100 when being at the stop position.

As shown in FIGS. 1, 3 and 4, in the recess part 6, one end of a wiper arm 11 is supported on the rear gate panel 4 supporting the rear window 3 to be rotatable around a rotation center axis P. In addition, one end of the wiper arm 11 may be supported on the rear spoiler 5. The tip side of the wiper arm 11 is urged toward the rear window 3. A central portion of the wiper blade 12 is supported on the tip of the wiper arm 11. The wiper blade 12 is pressed against a surface of the rear window 3. The wiper blade 12, at its stop position, is stored in the storage part 7. The wiper blade 12 is arranged substantially horizontally at the stop position.

As shown in FIG. 1, the wiper arm 11 (wiper blade 12) is reciprocatingly rotated between the stop position and a wiping end position by driving a drive motor (not shown), whereby the surface of the rear window 3 is wiped by the wiper blade 12.

As shown in FIGS. 2, 4 and 5, a washer nozzle 15 is arranged on the inside of such portion of the recess part 6 as exists on the further forward side of the vehicle than the rotation center axis P. More specifically, the washer nozzle 15 is mounted on the rear gate panel 4 (an inclined surface to be discussed later) corresponding to such portion (a groove part to be discussed later) of the rear spoiler 5 as exists on the deeper side than the rotation center axis P of the wiper arm 11. Washer liquid is supplied to the washer nozzle 15 through a supply pipe 16. The washer liquid is ejected from an ejection port 15a of the washer nozzle 15 toward a desired position of the rear window 3.

Since the washer nozzle 15 is arranged on the rear gate panel 4 corresponding to such portion of the rear spoiler 5 as exists on the deeper side than the rotation center axis P of the wiper blade 12, the washer nozzle 15 is covered by the rotation center axis P and rear spoiler 5. Thus, in a structure in which the rear spoiler 5 and rear wiper device are arranged on the upper end of the rear gate 2 (the rear end of the roof), the washer nozzle 15 can be arranged without exposing to the outside. No exposure of the washer nozzle 15 to the outside can suppress decline in the appearance of the vehicle.

As shown in FIGS. 3 and 5, in such portion of the rear spoiler 5 as exists on the deeper side than the rotation center axis P of the wiper blade 12, there is formed a bead 21 which extends in the longitudinal direction of the vehicle 1 and ranges to the storage part 7. The washer nozzle 15 is mounted on such portion of the rear gate panel 4 (an inclined surface to be discussed later) as corresponds to a groove part 22 formed on the lower side of a lower wall 21a of the bead 21. The washer nozzle 15 is mounted on the rear gate panel 4 between the side walls 22a of the groove part 22.

The recess part 6 of the rear spoiler 5 includes, as described above, the storage part 7 for storing the wiper blade 12 and groove part 22 extending in the forward direction of the vehicle 1. The groove part 22 has an opening 22b which stores the washer nozzle 15 therein and opens within the storage part 7. This enables formation of the storage part 7 for storing therein the wiper blade 12 at the stop position, and also enables arrangement of the washer nozzle 15 in a portion corresponding to the groove part 22 capable of opening within the storage part 7. Accordingly, the storage spaces of the wiper blade 12 and washer nozzle 15 can be made separate from each other, which prevents the recess part 6 from increasing in size, thereby enabling enhancement in the appearance of the vehicle.

The opening 22b side (the rear side of the vehicle 1) of the side walls 22a of the groove part 22 is continuously connected to the storage part 7. The washer nozzle 15 is arranged on such portion (an inclined surface to be discussed later) of the rear gate panel 4 as is interposed between the side walls 22a of the groove part 22 communicating with the storage part 7. The sectional area of such portion of the groove part 22 in the extension direction as exists on the rear side of the vehicle 1 is larger than that of such portion of the groove part 22 as exists on the forward side of the vehicle 1. The center line X (see FIGS. 6 and 7) of the groove part 22 is displaced, on the opening 22b side, to the tip side (storage part 7 side) of the wiper blade 12 at the stop position. Since the sectional area of the groove part 22 is formed lager on the side of the opening 22b existing on the rear side of the vehicle 1 than that on the front side of the vehicle 1, the opening 22b is prevented against an excessive size increase, thereby enabling enhancement in the appearance of the vehicle.

The center line X of the groove part 22 (see FIGS. 6 and 7) is displaced, on the opening 22b side, to the tip side of the wiper blade 12 existing at the stop position and the washer nozzle 15 is interposed between the side walls 22a of the groove part 22. Thus, washer liquid ejected from the washer nozzle 15 can be guided between the side walls 22a of the groove part 22 and the ejection direction of the washer liquid can be guided while it is directed toward the wiper blade 12. Accordingly, the washer liquid can be ejected toward the opening 22b of the groove part 22 without disturbance.

As shown in FIGS. 3 and 5, the storage part 7 (a portion where the wiper arm 11 and wiper blade 12 are to be stored) is opposed to the rear window 3. The groove part 22 is opposed to the rear gate panel 4 (body). The rear gate panel 4 has an inclined surface 25 which is opposed to the groove part 22 (and is interposed between the side walls 22a of the groove part 22) and the portion of which existing on the rear side of the vehicle 1 is situated lower the portion thereof existing on the front side of the vehicle 1

The inclined surface 25 is arranged to extend from the deep side (the forward side of the vehicle 1) of the groove part 22 to the opening 22b. The upper edge of the rear window 3 is connected to such portion of the inclined surface 25 as exists on the deeper side of the groove part 22 than the opening 22b. The washer nozzle 15 is arranged on such portion of the inclined surface 25 as is situated higher than the opening 22b (a portion where the lower wall 21a of the bead 21 existing on the rear side of the vehicle 1 is situated) of the groove part 22. And, the washer nozzle 15 is arranged on the inclined surface 25 at a position higher than the opening 22b of the groove part 22.

The washer nozzle 15 is arranged on such portion of the inclined surface 25 as exists on the deep side of the groove part 22 and is situated higher than the opening 22b of the groove part 22 (a portion S of the lower wall 21a of the bead 21 existing on the rear side of the vehicle 1). Therefore, when viewed from behind, the washer nozzle 15 is shielded by the wall of the opening 22b of the groove part 22 (the portion S of the lower wall 21a of the bead 21). Accordingly, the washer nozzle 15 is not exposed and thus cannot be seen from outside.

Since the upper edge of the rear window 3 is connected to such portion of the inclined surface 25 as exists on the deeper side than the opening 22b of the groove part 22, even when the washer liquid ejected from the washer nozzle 15 interferes with the opening 22b of the groove part 22, the washer liquid is prevented from dripping down onto the rear window 3 to scatter.

As shown in FIGS. 2, 4, 5 and 7, the ejection port 15a of the washer nozzle 15 is directed toward the storage part 7 between the side walls 22a of the groove part 22. That is, the ejection port 15a of the washer nozzle 15 is directed to the vertical wall 7a of the storage part 7 of the side walls 22a, that is, to the vertical wall 7a arranged so as to be retracted with respect to the vertical wall 6a of the recess part 6 (to the side where the end of the opening 22b of the side walls 22a is retracted). Thus, even when the washer liquid is ejected toward the storage part 7, the washer liquid can be positively ejected toward such portion of the rear window 3 as exists in the range of the operation of the wiper blade 12 without interfering with the vertical wall 7a.

In a vehicle using the above-configured arrangement structure of the washer nozzle 15, for example, the washer liquid is ejected from the ejection port 15a of the washer nozzle 15 by the operation of a driver. The washer liquid ejected from the ejection port 15a of the washer nozzle 15 is ejected toward the vertical wall 7a of the side walls 22a of the groove part 22, that is, toward the storage part 7. The washer liquid is guided by the side walls 22a of the groove part 22 to land on the surface of the rear window 3 in the range of the operation of the wiper blade 12.

Since the washer liquid ejected from the ejection port 15a of the washer nozzle 15 is ejected while it is guided by the side walls 22a, there is little possibility that it can be influenced by an airflow flowing during the vehicle running time or the like. Thus, even in the case of high speed running, variations in the washer liquid landing position can be suppressed with no influence of the airflow to stabilize the landing of the washer liquid, thereby making it possible to secure stable cleaning performance.

And, the washer nozzle 15 is arranged on such portion of the inclined surface 25 as exists within the portion of the groove part 22 situated on the deeper side of the rotation center axis P of the wiper blade 12 and as corresponds to the higher portion of the groove part 22 than the opening 22b. Accordingly, the view of the washer nozzle 15 from behind is shielded by the rotation center axis P and the wall of the opening 22b of the groove part 22 (the end portion of the lower wall 21a of the bead 21). Thus, in a structure where the rear spoiler 5 and rear wiper device are arranged on the upper end of the rear gate 2 (the rear end of the roof), the washer nozzle 15 can be arranged without deteriorating the appearance of the vehicle (without exposing the washer nozzle 15 to the outside).

In a vehicle using the above arrangement structure of the washer nozzle 15, the washer nozzle 15 can be made inconspicuous and the washer liquid can be ejected to the aimed portion without being influenced by the airflow flowing during the vehicle running time, thereby making it possible to stabilize the landing position of the washer liquid. Also, since the washer nozzle 15 is arranged behind the rotation center axis P, even when it is snowing or the like, snow and mud are hard to enter the portion where the washer nozzle 15 is arranged, thereby preventing the washer nozzle 15 from being buried with snow or the like.

Therefore, in the vehicle 1 including the rear spoiler 5 with the rear wiper device stored therein, the washer nozzle 15 can be arranged so as not to impair the appearance of the vehicle but to prevent the ejection of the washer liquid from being disturbed by the vehicle running wind or the like.

Here, in the above embodiment, description has been given of an example in which the washer nozzle arrangement structure is applied to the rear window 3 which is arranged with a small angle from the horizontal direction. However, the structure can also be applied to a rear window arranged with a large angle from the horizontal direction.

As has been described heretofore, the washer nozzle arrangement structure of the invention comprises:
a rear spoiler arranged on a portion of a body above a rear window and including a recess part formed on a side of the rear window;
a wiper arm, wherein a rotation center axis disposed on one end side of the wiper arm is supported on the vehicle;
a wiper blade, supported on the other end side of the wiper arm, and configured to be stored in the recess part when the wiper arm is in a stop position; and
a washer nozzle configured to eject a washer liquid toward the rear window,
wherein the washer nozzle is arranged in an inside of a portion of the recess part which exists on a forward side of the vehicle than the rotation center axis of the wiper blade.

Since the washer nozzle is arranged in such portion of the rear spoiler as exists on the further forward side (deeper side) of the vehicle than the rotation center axis of the wiper blade, that is, in such portion of the body as corresponds to recess part, the washer nozzle is covered by the rotation center axis and rear spoiler. Thus, in the structure in which the rear spoiler and rear wiper are arranged on the upper end of the rear gate (the rear end of the roof), the washer nozzle can be arranged without deteriorating the appearance of the vehicle (without exposing the washer nozzle to the outside).

Therefore, in a vehicle including a rear spoiler with a rear wiper device stored therein, a washer nozzle can be arranged so as not to impair the appearance of the vehicle but to prevent the ejection of washer liquid from being disturbed by the vehicle running wind or the like.

The recess part of the rear spoiler includes:
a storage part configured to store the wiper blade therein; and,
a groove part, extending to the forward side of the vehicle, having an opening which opens to the front side, and configured to store the washer nozzle therein.

Since the storage part for storing therein the wiper blade at the stop position is formed and the washer nozzle can be arranged in such portion of the groove part as is capable of opening within the storage part, the storage spaces of the wiper blade and washer nozzle can be made separate from each other, which prevents the size of the recess part from increasing, thereby making it possible to enhance the appearance of the vehicle.

The storage part is opposed to the rear window,
the groove part is opposed to the body,
the body has an inclined surface which is opposed to the groove part, wherein a portion of the inclined surface on a rear side of the vehicle is situated lower than a portion thereof on the forward side, and
the washer nozzle is arranged on the inclined surface at a position upper than the opening of the groove part.

Since the washer nozzle is arranged on such portion of the inclined surface as exists on the deeper side of the groove part than the groove part at a higher position than the opening (the position of the wall of the opening), when viewed from behind, the washer nozzle is shielded by the opening of the groove part. And, by connecting the upper edge of the rear window to such portion of the inclined surface as exists on the deeper side than the opening of the groove part, even when the washer liquid ejected from the washer nozzle interferes with the opening of the groove part, the washer liquid is allowed to drip down onto the rear window.

A section area of the groove part on the rear side in an extension direction of the groove part is larger than a section area of the groove part on the forward side in the extension direction, and
a center line of the groove part, on a side of the opening, is displaced toward a tip side of the wiper blade at the stop position.

The groove part is formed such that the section area of the opening portion thereof existing on the vehicle rear side is larger than that of the portion thereof existing on the vehicle front side, and the center line of the groove part, on the opening side thereof, is displaced to the tip side of the wiper blade. Thus, the washer liquid can be positively ejected while its ejection direction is guided toward the wiper blade and the opening is prevented from being increased excessively in size, thereby enabling enhancement in the appearance of the vehicle.

The recess part has a vertical wall extending toward the forward side of the vehicle in a width direction of the vehicle, and the storage part forms a step portion on a side of the stop position, which is recessed toward the front side of the vehicle from the vertical wall.

Formation of the step portion recessed toward the forward side of the vehicle enables formation of the storage part in the recess part.

With the washer nozzle arrangement structure of the invention, in a vehicle including a rear spoiler with a rear wiper device stored therein, the washer nozzle can be arranged so as not to impair the appearance of the vehicle but to prevent the ejection of the washer solution from being disturbed by the vehicle running wind or the like.

The invention can be used in the industrial field of a washer nozzle arrangement structure for use in a vehicle including a rear spoiler.

What is claimed is:

1. A washer nozzle arrangement structure, of a vehicle, comprising:
    a rear gate having a rear gate panel supporting an upper edge of a rear window;
    a rear spoiler attached to the rear gate panel overlapping the rear window and including a recess part facing the rear window;
    a wiper arm, one end of which being supported by a rotation shaft extending from the rear window, the wiper arm rotating about a rotation axis of the rotation shaft;
    a wiper blade, supported at another end of the wiper arm; and
    a washer nozzle mounted on the rear gate panel and configured to eject a washer liquid toward the rear window,
    wherein the recess part of the rear spoiler includes:
        a storage part configured to store the wiper blade therein when the wiper arm is in a horizontal position;
        a groove part, provided adjacent to the rotation shaft at a forward side of the vehicle with respect to the rotation shaft and positioned on the forward side of the vehicle with respect to the storage part, wherein the groove part extends in a forward direction of the vehicle with respect to the storage part and is configured to store the washer nozzle therein, and
        an opening surface that connects a rear end of the groove part and the storage part, wherein the opening surface defines an opening that connects a space defined by the storage part and a space defined by the groove part in a forward-rear direction of the vehicle,
    wherein the washer nozzle is arranged in the groove part on the forward side of the rotation shaft of the wiper blade and on an inclined surface, with respect to the rear window, on an upper side of the opening surface, and wherein the opening surface opposes the rotation axis on the forward side of the rotation axis.

2. The washer nozzle arrangement structure according to claim 1, wherein
    the storage part opposes the rear window,
    the groove part opposes the inclined surface of the rear gate panel above the upper edge of the rear window, the washer nozzle is attached to the inclined surface in the space defined by the groove part, and ejects the washer fluid into the space and towards the rear window, such that the washer nozzle is inconspicuous when the rear spoiler is viewed from a rear of the vehicle.

3. The washer nozzle arrangement structure according to claim 1, wherein
    a section area of the groove part increases as the groove part extends towards a rear of the vehicle, and
    the groove part is offset in a width direction of the vehicle with respect to the rotation shaft toward the wiper blade placed in the horizontal position.

4. The washer nozzle arrangement structure according to claim 1, wherein
    the recess part has a vertical wall extending in a width direction of the vehicle, and
    the storage part and the vertical wall part form a step portion such that the storage part is offset from the vertical wall towards a front of the vehicle.

* * * * *